US008805038B2

(12) United States Patent
Chen et al.

(10) Patent No.: US 8,805,038 B2
(45) Date of Patent: Aug. 12, 2014

(54) LONGITUDINAL IMAGE REGISTRATION ALGORITHM FOR INFRARED IMAGES FOR CHEMOTHERAPY RESPONSE MONITORING AND EARLY DETECTION OF BREAST CANCERS

(75) Inventors: Chung-Ming Chen, Taipei (TW); Si-Chen Lee, Taipei (TW); Wan-Jou Lee, Taipei (TW); Che-Wei Chang, Taipei (TW); Yu-Chun Chien, Taipei (TW); Chia-Yen Lee, Taipei (TW)

(73) Assignee: National Taiwan University, Taipei (TW)

( * ) Notice: Subject to any disclaimer, the term of this patent is extended or adjusted under 35 U.S.C. 154(b) by 390 days.

(21) Appl. No.: 13/174,501

(22) Filed: Jun. 30, 2011

(65) Prior Publication Data

US 2013/0004035 A1    Jan. 3, 2013

(51) Int. Cl.
*G06K 9/00* (2006.01)
(52) U.S. Cl.
USPC ................... 382/128; 128/922; 250/316.1
(58) Field of Classification Search
USPC ............... 382/100, 128, 129, 130, 131, 132; 128/922; 378/4–27; 250/316.1, 330, 250/339.08, 339.11, 493.1, 495.1; 702/127, 702/130, 134, 135
See application file for complete search history.

(56) References Cited

U.S. PATENT DOCUMENTS

| | | | | |
|---|---|---|---|---|
| 6,047,080 | A * | 4/2000 | Chen et al. | 382/128 |
| 6,718,193 | B2 * | 4/2004 | Knoplioch et al. | 600/407 |
| 7,333,648 | B2 * | 2/2008 | Edic et al. | 382/131 |
| 7,343,032 | B2 * | 3/2008 | Oakley et al. | 382/128 |
| 8,503,511 | B2 * | 8/2013 | Suberviola | 375/150 |
| 2007/0274579 | A1 * | 11/2007 | Cai et al. | 382/131 |
| 2009/0279758 | A1 * | 11/2009 | Dikici et al. | 382/128 |
| 2011/0058718 | A1 * | 3/2011 | Nakajima et al. | 382/128 |
| 2012/0207364 | A1 * | 8/2012 | Ohlson | 382/128 |

OTHER PUBLICATIONS

Kostelec, Peter J., et al. "Multiresolution elastic image registration", Med. Phys. 25 (9), Sep. 1998, pp. 1593-1604.
Wink, Onno, et al. "Multiscale Vessel Tracking", IEEE Transactions on Medical Imaging, vol. 23, No. 1, Jan. 2004, pp. 130-133.
Wirth, Michael A., et al. "Nonrigid mammogram registration using mutual information", SPIE Medical Imaging: Image Processing, San Diego USA, Feb. 2002, vol. 4684, pp. 562-573.
U.S. Appl. No. 12/965,642, filed Dec. 10, 2010.

* cited by examiner

*Primary Examiner* — Anand Bhatnagar

(57) ABSTRACT

This algorithm provides a marker-free approach to establishing the pixel correspondence among the IR images taken at different times, which is the basis for quantitatively characterizing the variation of the heat energy and patterns pixel-wise on a breast surface. The idea is to use the corner points of the heat pattern and the branch points of the skeletons of the heat pattern on the body surface as the initial fiducial points for the longitudinal IR image registration. The Thin-Plate Spline technique is used to model the nonlinear deformation between two IR images taken at two different times. Mutual information between the TPS-transformed image and the target image is employed as the metric quantifying the quality of the longitudinal IR image registration. To optimize the registration, Nelder-Mead simplex method is used to locally modify the pairings of the fiducial points in the source and target IR images to maximize the mutual information.

11 Claims, 6 Drawing Sheets

LONGITUDINAL IMAGE REGISTRATION ALGORITHM FOR INFRARED IMAGES FOR CHEMOTHERAPY RESPONSE MONITORING AND EARLY DETECTION OF BREAST CANCERS

FIELD OF THE INVENTION

The invention relates to a method of image registration for assessing chemotherapy treatment response and early detection. More specifically, this invention relates to an image registration of longitudinal infrared images accepting MIR (middle-wave Infra-red) and LIR (long-wave Infra-red) over several time points in order to obtain more usable information.

BACKGROUND OF THE INVENTION

The breast cancer has been one of major cancer diseases leading death for a long time. It can effectively reduce menace of breast cancer by detecting breast cancer early and monitoring the effect of chemotherapy completely. However, there are not any methods achieving the goals effectively. Therefore, it is an important issue to detect the breast cancer early for the health of women.

Images generate by medical modalities such as X-ray mammograms, MRI images and Ultrasound has the characteristic of showing distinct anatomic features such as nipples and boundaries. These features are easy to distinguish such that they are used as feature points for the transformed models. In contrast, infrared images have less distinct boundaries, therefore it is challenging to detect feature points for image registration and making infrared images alignment a difficult hurdle to cross.

Due to the advantages of non-invasion, non-contact, passivity, non-radiation and the ability of detecting the slight variations of temperature caused by neovascularization, Infrared imaging technique has been developed and employed for assessing chemotherapy treatment response. Serving as a medical imaging modality, the Infra-red (IR) image reveals the heat distribution on the surface of the human body. Cancerous tissues tend to have a higher temperature signature than their surrounding normal tissues, and for this reason, IR image has long been studied in hope to serve as an indicator for cancerous breast tissues. Nevertheless, the usefulness of IR images in detecting breast cancers at a single time is not usually enough to assess the chemotherapy treatment response and early detection due to the physiological and environmental influence on the skin temperature distribution. Alternatively, the IR images in detecting tumors over several time points attempt to determine the malignancy of breast tissues based on the variation of heat pattern.

In the prior art, some methods have been reported to use the whole breast temperature or the temperature on the elected region of the breast IR images as the evaluation index for chemotherapy treatment response (Wirth, M. A., Narhan, J., Gray, D., "Nonrigid mammogram registration using mutual information", *Proc. SPIE*. 2002, Vol. 4684, pp. 562-573 and Kostelec, P. J., Weaver, J. B., Healy Jr., D. M., "Multiresolution elastic image registration", *Med. Phys.* 1998; 25: 1593-1604). The accuracy of assessing the chemotherapy treatment response for these methods would be effected from the temperature of the normal tissues near the tumor tissues. Besides, there are inhomogeneous and anisotropic soft tissues over the breast so the heat patterns will transform for the posture and the position of the patient changed at different time points. It will add the difference of the analysis process.

Therefore, the inventor thought of the idea of an improvement invention after considering the shortage of the prior art and finally invented the case of "an image registration algorithm for assessing chemotherapy treatment response and early detection". This present application proposes an image registration method for longitudinal dual spectrum infrared images and except that we can use Dual-Spectrum Heat Pattern Separation (DS-HPS) algorithm (U.S. application Ser. No. 12/965,642, Dec. 10, 2010, filed by the applicant) to quantify the effect of chemotherapy by adding the information of heat changing with time. The effects of chemotherapy on breast cancer are effectively traced and evaluated by using this method. The invention is briefly described as follows.

SUMMARY OF THE INVENTION

In the present application, the goal of image registration is to deform the difference geometry shapes of longitudinal infrared images accepting LIR and MIR alignment into the same structure and obtain more usable information. The image registration algorithm is separated into three steps: (1) Detecting feature points, especially, Harris corner detector algorithm is used to find corner points on infrared images and cross-points of the middle lines in the vessel heat patterns are found via Hessian matrix; (2) Searching corresponding points, we established the relationship of corner points and cross-points between the source image and the target image manually or automatically and form a set of corresponding point for Thin Plane Spline (TPS) model, where the target image is measured at the first time point as a reference image and the source image is measure after the target image for registering based on the target image; and (3) Dynamical correcting the locations of corresponding points, Nelder-Mead simplex method used to modify the locations of control points on the source image and maximize mutual information (MI). In this way, optimum and subpixel registration could be achieved by this step.

The heat pattern in the normal tissue shows less variation than that in the abnormal tissue for longitudinal infrared images. According to this characteristic, feature point detections in normal tissue can be performed via a detection algorithm. However, we also can detect feature points in abnormal tissue. And the corresponding relationship between feature points on different images could be determined by the corresponding point pairs which are established manually and automatically. The corresponding point pair has two feature points on different images, respectively, which are used as data sets for the transformed model to perform the image registration. The similarity measure index is used to compare and measure quantitatively how closely target images and registered source images matched. Applying the similarity measure index through an optimization process, relationship functions are adjusted to improve accuracy until the similarity measure index is optimized within iterations. In this way, a more robust registered source image could be obtained.

Such an image registration algorithm to quantify the longitudinal infrared images makes the invented algorithm extremely suitable for testing the human body applications including non-invasive detection of human body, assessing chemotherapy treatment response, early detection and etc.

According to the first aspect of the present invention, a quantitative analysis method is provided. The spatiotemporal registration algorithm to quantify a longitudinal infrared image includes the following steps of: detecting a plurality of feature points, wherein the plurality of feature points are respectively detected from a target image and a source image via a Harris corner detector and a plurality of cross-points of the vessel middle lines; searching a plurality of corresponding point pairs from the plurality of feature points on the target image and the source image by the search method, respectively; and correcting a plurality of corresponding point locations by a correcting method to obtain a registered source image.

According to the second aspect of the present invention, a method for establishing a registered image, comprising steps of: detecting a first plurality of feature points having a first plurality of cross-points of vessel middle lines on a first image and a second plurality of feature points having a second plurality of cross-points of vessel middle lines on a second image; searching the first plurality of feature points and the second plurality of feature points to obtain a plurality of corresponding points; and correcting locations of the plurality of corresponding points to obtain a registered second image.

According to the third aspect of the present invention, a method for an image registration, comprising steps of: detecting a plurality of cross-points of vessel middle lines on an image to obtain a plurality of corresponding points; and applying the plurality of corresponding points to a transformed model.

The above aspects and advantages of the present invention will become more readily apparent to those ordinarily skilled in the art after reviewing the following detailed descriptions and accompanying drawings, in which:

BRIEF DESCRIPTION OF THE DRAWINGS

FIG. 4 shows that the results of finding cross-points of the middle lines in the vessel heat pattern after the chemotherapy over several time points, wherein FIG. 5 shows that the deformed images by the Nelder-Mead simplex method, wherein

FIGS. 6(a)-6(d) show the result IR images of longitudinal registration for chemotherapy patients, wherein FIG. 6(a) is the LIR image at time point 1 (the target image), FIG. 6(b) is the LIR image at time point 2 (the source image), FIG. 6(c) is the registered image at time point 2 (the deformed source image), and FIG. 6(d) is the result image obtained from superimposing the Canny boundary of FIG. 6(c) on the image of FIG. 6(a).

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only it is not intended to be exhaustive or to be limited to the precise form disclosed.

Figure 1:
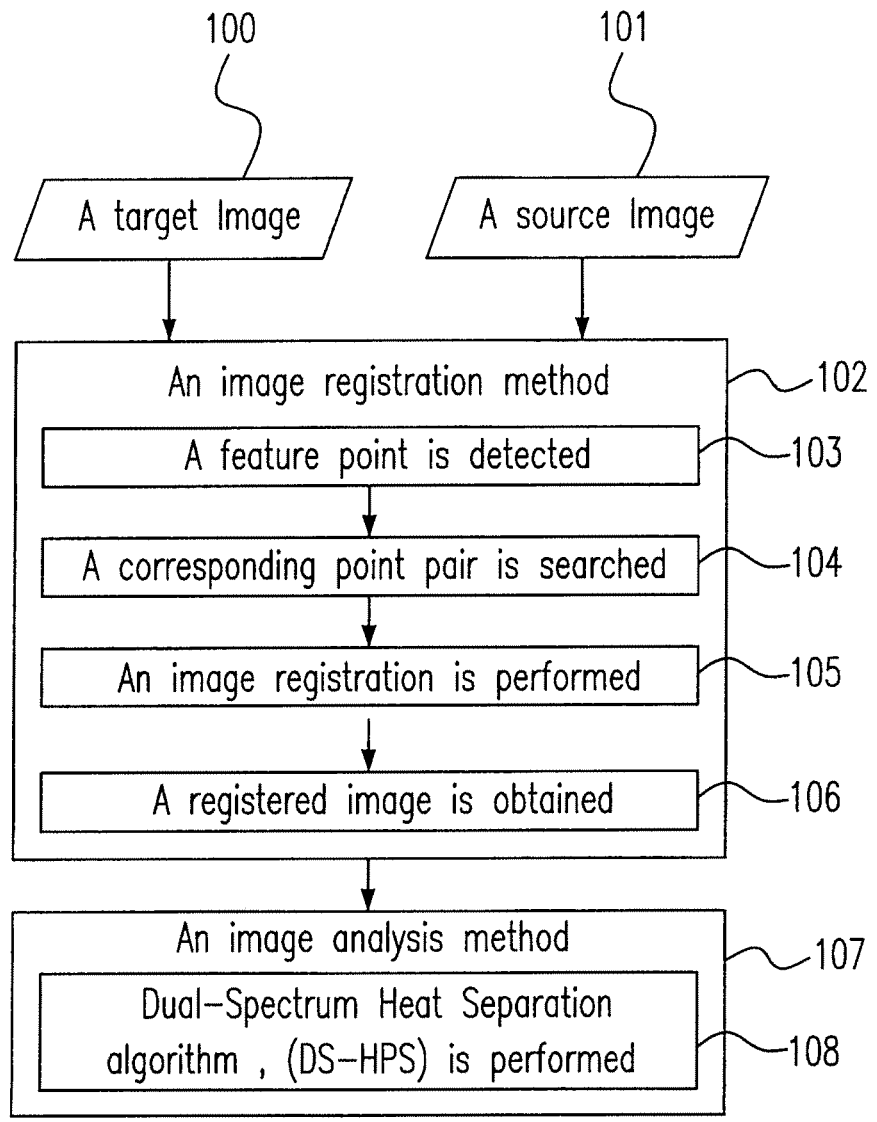
FIG. 1 shows that the software framework diagram of the present invention for quantifying longitudinal infrared images.

A spatiotemporal registration algorithm to quantify longitudinal infrared images is established and shown in FIG. 1. Please refer to FIG. 1, which shows the software framework diagram of the present invention for quantifying longitudinal infrared images. Our basic idea is to estimate the heat pattern change on the breast skin with IR photon information from a pair of MIR and LIR cameras. To quantify the change of the heat pattern, a dual-spectrum heat pattern separation (DS-HPS) algorithm (U.S. application Ser. No. 12/965,642, Dec. 10, 2010, filed by the applicant) is developed to separate the tissue area of high temperature from that of normal temperature in both of the MIR and LIR images. Two descriptors are computed to indicate the structural and functional change of the tissues due to chemotherapy. One is the area of the high temperature region on the breast surface and the other is the mean effective volume of high temperature tissues under the high temperature region. Increasing or decreasing of these two descriptors may indicate the existence of malignant breast lesions and effectiveness of chemotherapy, respectively. As described in FIG. 1, the image registration method 102 was used to obtain the registered image 106 in a source image 101 of a MIR image and a LIR image, and then the image analysis method 107 could analyze the registered image 106 for quantifying the longitudinal IR image. Preferably, the target image 100 and the source image 101 are obtained from a pair of MIR and LIR cameras. Preferably, the image registration method 102 includes detecting a feature point 103, searching a corresponding point pair 104 and performing an image registration 105. Preferably, the DS-HPS algorithm 108 is used to estimate the energy map of the high temperature area and the normal temperature area. As a result, the longitudinal variations of the area in the high temperature area and its surrounding blood vessels could be computed from the DS-HPS algorithm 108 according to the registered image to indicate the location of tumors and effectiveness of chemotherapy, since the cancerous tissues tend to have a higher temperature than the surrounding normal tissues.

Figure 2:
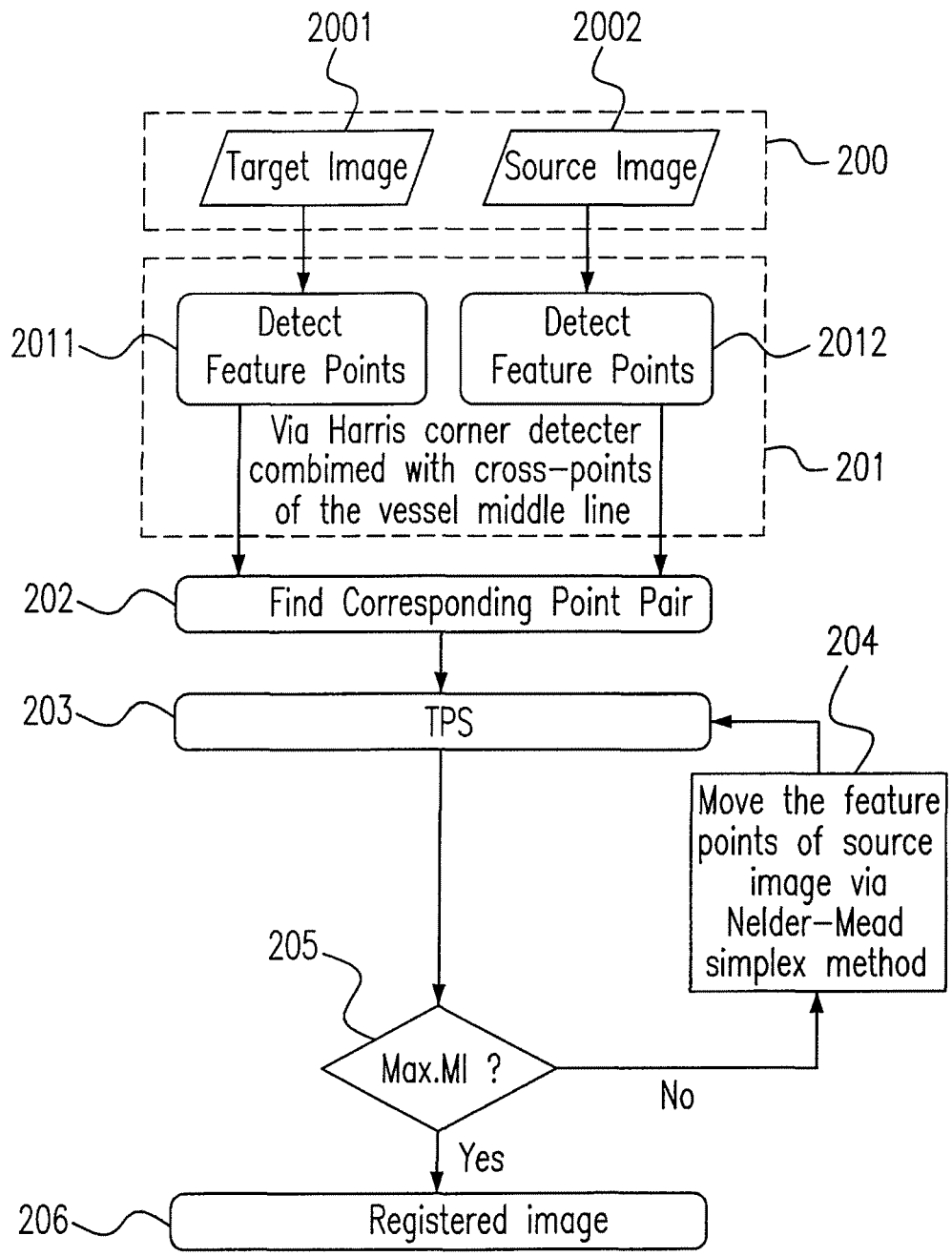
FIG. 2 shows that the spatiotemporal registration flow chart of the present invention for obtaining the registered image.

Please refer to FIG. 2, which shows that the flow chart of a spatiotemporal registration algorithm to quantify longitudinal infrared images in the present invention. The image registration is to deform the difference geometry shapes of longitudinal infrared images accepting LIR and MIR alignment into the same structure. The process of making the image registration over several time points includes the following steps:

Step 200: The target image 2001 and the source image 2002 are obtained from a pair of MIR and LIR cameras, respectively.

Step 201: Detecting the feature points in the target image 2001 and the source image 2002, respectively. Preferably, the feature points 2011 in the target image 2001 and the feature points 2012 in the source image 2002 are detected through cross-points of the vessel middle lines combined with Harris corner detector, in which Harris corner detector algorithm is used to find corner points on heat patterns and cross-points of the middle lines in the vessel heat patterns are found via Hessian matrix. In the present application, we design a method to find the cross-points of the middle lines in the vessel heat patterns through Hessian matrix in the 2D image, defined as:

$$HM = \begin{bmatrix} \frac{\partial^2 Is}{\partial x^2} & \frac{\partial^2 Is}{\partial x \partial y} \\ \frac{\partial^2 Is}{\partial y \partial x} & \frac{\partial^2 Is}{\partial y^2} \end{bmatrix} \quad (1)$$

where Is represents the 2D image. In the prior art, Wink has provided a VR index to quantify the response to the characteristic values of the Hessian matrix in the vessel (Wink, O., Niessen, W. J., Viergever, M. A., "Multiscale vessel tracking," *IEEE Transactions on Medical Imaging.* 2004; 23 (1): 130-133), as following:

$$VR = \exp\left(\frac{\left(\frac{\lambda_1}{\lambda_2}\right)^2}{-2\beta^2}\right)\left(1 - \exp\left(\frac{\lambda_1^2 + \lambda_2^2}{-2c^2}\right)\right) \quad (2)$$

where $\lambda_1$ is a smaller characteristic absolute value and $\lambda_2$ is a bigger characteristic absolute value. In the embodiment, we let $\beta$ and c are 0.5 and 450, respectively. And then, the threshold of the VR index has to be determined for obtaining the image represented by $\lambda_1$ and $\lambda_2$ in the vessel region of the IR image, which is 0.0005. Finally, the MATLAB is used to find out the middle lines of the vessel by the command "bwmorph". The algorithm is described as follows:

1. Removing the pixels on the IR image which meet Conditions 1, 2 and 3.
2. Removing the pixels on the IR image which meet Conditions 1, 2 and 4.

where,
Condition 1:

$$C\_1(cp) = \sum_{i=1}^{4} b_i = 1 \quad (3)$$

$$b_i = \begin{cases} 1 & \text{if } np_{2i-1} = 0 \text{ and } (np_{2i} = 1 \text{ or } np_{2i+1} = 1) \\ 0 \end{cases} \quad (4)$$

where $np_1, np_2 \ldots np_8$ are the points which are ordered clockwise, and $np_1$ is at the far right.
Condition 2:

$$2 \leq \min\{C\_2a(cp), C\_2b(cp)\} \leq 3 \quad (5)$$

$$C\_2a(cp) = \sum_{i=1}^{4} np_{2i-1} \vee np_{2i} \quad (6)$$

$$C\_2b(cp) = \sum_{i=1}^{4} np_{2i} \vee np_{2i+1} \quad (7)$$

Condition 3:

$$(np_2 \vee np_3 \vee \overline{np_8}) \wedge np_1 = 0 \quad (8)$$

Condition 4:

$$(np_6 \vee np_7 \vee \overline{np_4}) \wedge np_5 = 0 \quad (9)$$

The middle line of the vessel will be found while the image Is is no longer various after repeating the algorithm.

Step 202: Finding a corresponding point pair in the target image 2001 and the source image 2002. Preferably, the corresponding point pairs in the target image 2001 and in the source image 2002 are established manually, respectively.

Step 203: Using the feature points as the control points of the TPS transformed model for deforming the source image 2002, where the control points are used to establish the transformed model.

Step 204: Moving the control points of the TPS transformed model in the source image 2002 via the Nelder-Mead simplex method within iterations. Preferably, the mutual information is used as the cost function into Nelder-Mead simplex method for iteration in order to constantly modify the subpixels of the control points of the TPS transformed model in the source image 2002. Preferably, the mutual information is a similarity measure based on Entropy between the target image 2001 and the source image 2002. In the present application, the X and Y coordinates of the control points in the source image 2002 are used to randomly generate the displacement between +3 and −3 pixels in order to obtain N+1 initial solutions. The algorithm is described as follows:

1. Sorting the N+1 solutions according to the cost function:

$$f_{NM}(\text{loc}_1) \leq f_{NM}(\text{loc}_2) \leq \ldots \leq f_{NM}(\text{loc}_{N+1}) \quad (10)$$

where the $\text{loc}_i$ is the initial solution making the sort of the cost function i, i=1 ... (N+1).

2. Removing the $\text{loc}_{N+1}$ and calculating the central point:

$$loc_{cent} = \frac{1}{N}\sum_{i=1}^{N} loc_i \quad (11)$$

3. Reflection
Calculating the reflection point:

$$\text{loc}_{ref} = (1+\alpha)\text{loc}_{cent} - \alpha \cdot \text{loc}_{N+1} \quad (12)$$

If $f_{NM}(\text{loc}_1) \leq f_{NM}(\text{loc}_{ref}) < f_{NM}(\text{loc}_N)$, the $\text{loc}_{ref}$ replaces the $\text{loc}_{N+1}$ and then the process returns to Step 1.
If $f_{NM}(\text{loc}_{ref}) < f_{NM}(\text{loc}_1)$, the process performs Step 6.
If $f_{NM}(\text{loc}_{ref}) \geq f_{NM}(\text{loc}_N)$, the process performs Step 5.

4. Expansion
Calculating the expansion point:

$$\text{loc}_{ex} = \gamma \cdot \text{loc}_{ref} + (1-\gamma)\text{loc}_{cent} \quad (13)$$

If $f_{NM}(\text{loc}_{ex}) < f_{NM}(\text{loc}_{ref})$, the $\text{loc}_{ex}$ replaces the $\text{loc}_{N+1}$ and then the process returns to Step 1, or the $\text{loc}_{ref}$ replaces the $\text{loc}_{N+1}$ and then the process returns to Step 1.

5. Contraction
Calculating the contraction point:

$$\text{loc}_{con} = \beta \cdot \text{loc}_{N+1} + (1-\beta)\text{loc}_{cent} \quad (14)$$

If $f_{NM}(\text{loc}_{con}) < f_{NM}(\text{loc}_{N+1})$, the $\text{loc}_{con}$ replaces the $\text{loc}_{N+1}$ and then the process returns to Step 1, or performing Step 6.

6. Shrink
All points shrink forwards to $\text{loc}_1$:

$$\text{loc}_i = \delta \cdot \text{loc}_i + (1-\delta)\text{loc}_1 \quad (15)$$

Repeating Step 1-6, the solution of the algorithm is optimized when the iteration times reach to 1000 or the change of the cost function is smaller than 0.01. In the present embodiment, the reflection parameter $\alpha$, the expansion parameter $\gamma$, the contraction parameter $\beta$ and the shrink parameter $\delta$ are 1, 2, 0.5 and 0.5, respectively.

Step 205: If the mutual information is the maximum, the process moves towards Step 206, or returns to Step 204.

Step 206: The registered image is obtained while the MI is the maximum.

Figures 3A, 3B:
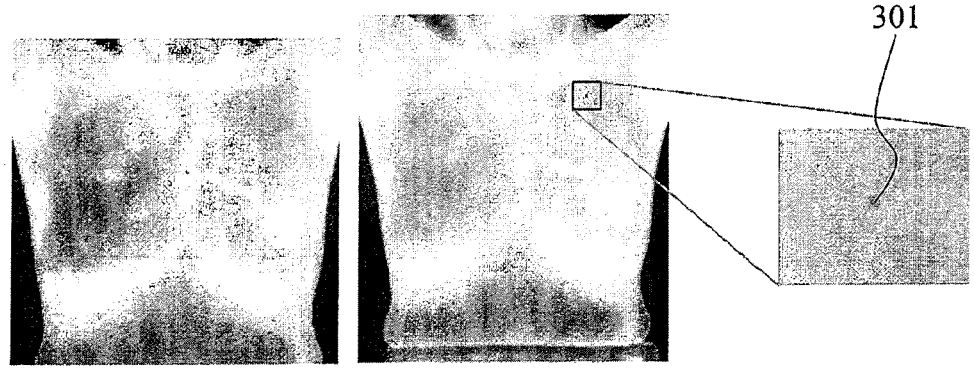
FIG. 3(a) is a LIR image acted as a target image to register with a MIR image acted as a source image.
FIG. 3(b) is a registered MIR image with an accompanying drawing which shows the markers on the body skin and FIG. 3(c) shows the high accuracy in the boundaries of the markers and the low accuracy in the boundaries of the body sides.
Figure 3C:

Please refer to FIG. 3(a), which is a LIR image acted as a target image to register with a MIR image acted as a source image. Please refer to FIG. 3(b), which is a registered MIR image with an accompanying drawing. Preferably, the markers 301 on the patient body are marked before detecting for the control points of Dual-Spectrum IR image registration. Please refer to FIG. 3(c), which shows the high accuracy in the boundaries of the markers and the low accuracy in the boundaries of the body sides. Preferably, the red lines 302 are the boundaries from the Canny edge detection.

Figures 4A, 4B:
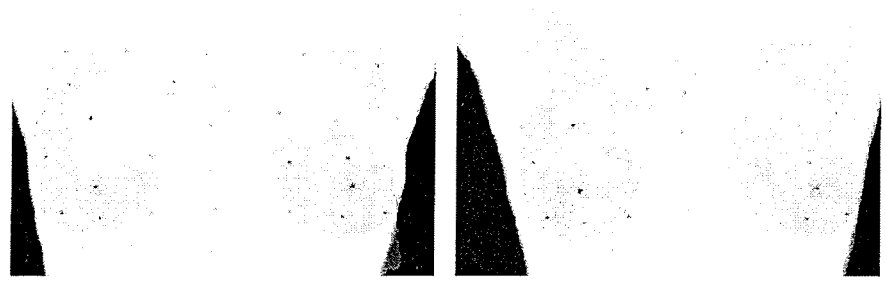
FIG. 4(a) is the LIR image at time point 1.
FIG. 4(b) is the LIR image at time point 2, FIGS. 4(c) and (d) respectively show the vessel region determined by the Hessian matrix based on the results of analyzing the images of FIGS. 4(a) and (b), and the red dots in FIGS. 4(e) and (f) represent the corresponding cross-points of the middle lines in the vessel.
Figures 4C, 4D:
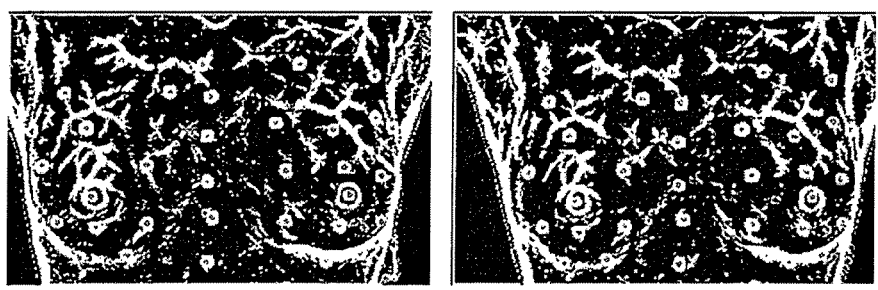
Figures 4E, 4F:
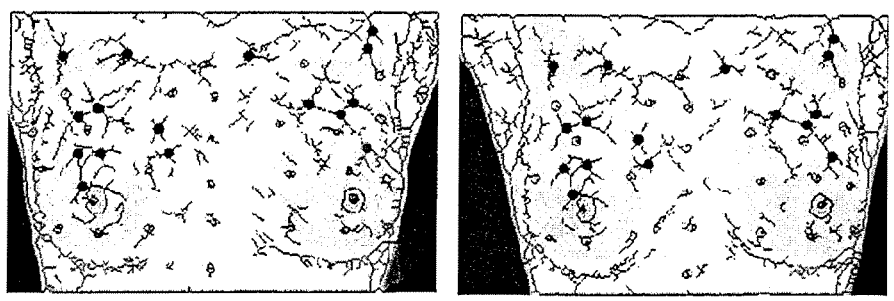

Please refer to FIG. 4, which shows the results of finding cross-points of the middle lines in the vessel heat pattern after the chemotherapy over several time points. Please refer to FIGS. 4(a) and (b), which are the LIR image phototaked at time point 1 and phtotaked at time point 2, respectively. Please refer to FIGS. 4(c) and (d), which respectively show the vessel region determined by the Hessian matrix based on the results of analyzing the images of FIGS. 4(a) and (b). Please refer to FIGS. 4(e) and (f), in which the red dots represent the corresponding cross-points of the middle lines in the vessel. Preferably, we can use cross-points of the middle lines in the vessel as the control points for the image registration over several times.

Figures 5A, 5B, 5C:
FIG. 5(a) is the LIR image at time point 1.
FIG. 5(b) is the registered LIR image at time point 2 before modifying by the Nelder-Mead simplex method.
FIG. 5(c) is the result image obtained from superimposing the Canny boundary of FIG. 5(b) on the image of FIG. 5(a)
Figures 5D, 5E:
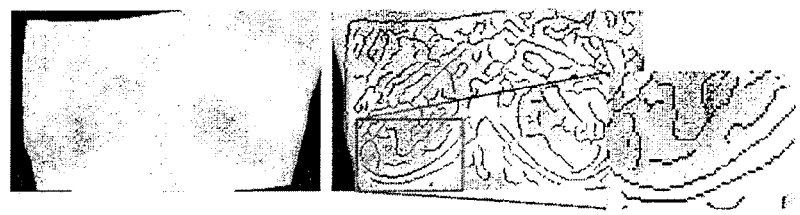
FIG. 5(d) is the registered image at time point 2 after modifying by the Nelder-Mead simplex method.
FIG. 5(e) is the result image obtained from superimposing the Canny boundary of FIG. 5(d) on the image of FIG. 5(a).

Please refer to FIG. 5, which shows that the deformed images by the Nelder-Mead simplex method. Please refer to FIG. 5(a), which is the LIR image at time point 1. Please refer to FIG. 5(b), which is the registered LIR image at time point 2 before modifying by the Nelder-Mead simplex method. Please refer to FIG. 5(c), which is the result image obtained from superimposing the Canny boundary of FIG. 5(b) on the image of FIG. 5(a). Please refer to FIG. 5(d), which is the registered image at time point 2 after modifying by the Nelder-Mead simplex method. Please refer to FIG. 5(e), which is the result image obtained from superimposing the Canny boundary of FIG. 5(d) on the image of FIG. 5(a). As a result, the better registered image in FIG. 5(e) can be obtained from modifying the control point locations in FIG. 5(c). Preferably, the image registration is performed through Nelder-Mead simplex method to optimize the mutual information value within iterations.

Figures 6A, 6B:
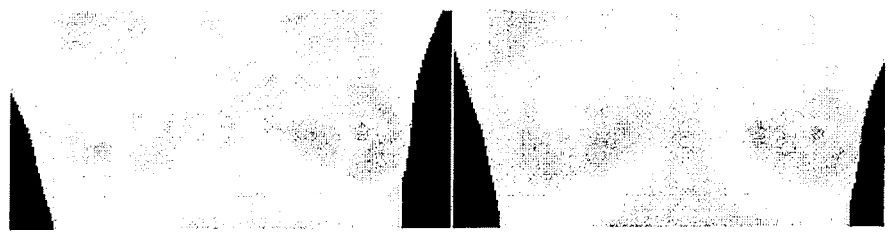
Figures 6C, 6D:

Please refer to FIGS. 6(a)-6(d), which show the result IR images of longitudinal registration for chemotherapy patients. FIG. 6(a) is the LIR image at time point 1 (the target image). FIG. 6(b) is the LIR image at time point 2 (the source image). FIG. 6(c) is the registered image at time point 2 (the deformed source image). FIG. 6(d) shows the result image obtained from superimposing the Canny boundary of FIG. 6(c) on the image of FIG. 6(a).

There are still other embodiments, which are described as follows.

Embodiment could be:

1. An image registration method, comprising steps of obtaining a Dual-Spectrum spectrogram of a long-wave Infra-red (LIR) image and a middle-wave Infra-red (MIR) image; detecting a first plurality of feature points on the target image and a second plurality of feature points on the source image, wherein the first plurality of feature points has a first plurality of cross-points of the vessel middle lines and the second plurality of feature points has a second plurality of cross-points of the vessel middle lines; searching a plurality of corresponding point pairs to determine corresponding relationships between the first plurality of feature points on the target image and the second plurality of feature points on the source image, wherein the corresponding point pair includes a pair of feature points; and correcting locations of the plurality of corresponding point to obtain a registered source image.

2. The method as claimed in Claim 1, wherein the first plurality of feature points further include a first plurality of corner points determined by a Harris corner detector and the second plurality of feature points further include a second plurality of Harris corner points determined by the Harris corner detector.

3. The method as claimed in Claim 1 quantifying a longitudinal infrared image.

4. The method as claimed in Claim 1, wherein the plurality of cross-points of vessel middle lines are obtained by the following steps: (a) analyzing a characteristic value in every pixel of the Dual-Spectrum spectrogram by using a Hessian matrix in order to obtain a general heat pattern based on a variation of an image intensity of the Dual-Spectrum spectrogram along a direction of a characteristic vector; and (b) estimating a vessel heat pattern from the general heat pattern to obtain the plurality of cross-points of vessel middle lines.

5. The method as claimed in Claim 1, wherein each of the plurality of the cross-points of vessel middle lines is an intersection of at least two vessels on the Dual-Spectrum spectrogram.

6. The method as claimed in Claim 1, wherein the corresponding point pair, consisting of a first feature point and a second feature point, is established manually or automatically.

7. The method as claimed in Claim 1, wherein the correcting step comprises: using the plurality of corresponding pairs as a data set with a plurality of transformed parameters for a Thin-Plate Spline (TPS) transformed model; measuring a mutual information (MI) between the target image and the source image; applying the MI as a cost function to a Nelder-Mead simplex method; modifying the locations of the second plurality of feature points based on results of the Nelder-Mead simplex method; and maximizing the MI through the TPS transformed model within iterations to obtain the registered source image.

8. The method as claimed in Claim 7, wherein the MI is measured by a similarity measure based on an Entropy and the MI is used for comparing and measuring quantitatively a difference between the target image and the registered source image.

9. The method as claimed in Claim 1, wherein the correcting step is further used for a subpixel registration for the second plurality of feature points.

10. The method as claimed in Claim 1, wherein the target image further includes a first long-wave Infra-red (LIR) image and a first middle-wave Infra-red (MIR) image and the source image further includes a second long-wave Infra-red (LIR) image and a second middle-wave Infra-red (MIR) image.

11. The method as claimed in Claim 1, wherein the source image is one of a single time image and a time-series image.

12. The method as claimed in Claim 1, wherein the source image is one of a single time image and a time-series image; searching the first plurality of feature points and the second plurality of feature points to obtain a plurality of corresponding points; and correcting locations of the plurality of corresponding points to obtain a registered second image.

13. The method as claimed in Claim 12, wherein the plurality of cross-points of vessel middle lines are obtained by the following steps: (a) using a Hessian matrix to obtain a heat pattern; and (b) estimating a geometry shape of a vessel based on the heat pattern.

14. The method as claimed in Claim 12, wherein the searching step is accomplished manually or automatically, and the correcting step is accomplished by a correcting method.

15. The method as claimed in Claim 12, wherein the cross-point of vessel middle lines is an intersection of middle lines of at least two vessels.

16. The method as claimed in Claim 14, wherein the correcting method comprises steps of: measuring a similarity measure index between the first image and the second image; applying the similarity measure index as a cost function to perform an image registration through a transformed model and an optimization algorithm; and obtaining the registered second image when the similarity measure index is optimized within iterations.

17. The method as claimed in Claim 16, wherein the transformed model and the optimization algorithm are a Thin-Plate Spline (TPS) model and a Nelder-Mead simplex method respectively.

18. The method as claimed in Claim 16, wherein the similarity measure index further is a mutual information (MI) measured based on an Entropy and is used to determine how closely the first image and the registered second image match quantitatively.

19. The method as claimed in Claim 12, wherein the first image further includes at least one of a first long-wave Infra-red (LIR) image and a first middle-wave Infra-red (MIR) image and the second image further includes at least one of a second long-wave Infra-red (LIR) image and a second middle-wave Infra-red (MIR) image.

20. The method as claimed in Claim 12, wherein the second image is one of a single time image and a time-series image.

21. A method for an image registration, comprising steps of: detecting a plurality of cross-points of vessel middle lines on an image to obtain a plurality of corresponding points; and applying the plurality of corresponding points to a transformed model.

22. The method as claimed in Claim 21, wherein the plurality of cross-points of vessel middle lines are obtained from a vessel heat pattern and the transformed model is a Thin-Plate Spline (TPS) model.

23. The method as claimed in Claim 21, wherein the plurality of cross-points of vessel middle lines are obtained by following steps: (a) obtaining a general heat pattern for the image by using a Hessian matrix; and (b) estimating a vessel heat pattern based on the general heat pattern to obtain the plurality of cross-points of vessel middle lines.

24. The method as claimed in Claim 21, wherein the plurality of corresponding points are obtained manually or automatically from the different images.

In conclusion, the image registration algorithm is proposed in the present invention for assessing chemotherapy treatment response and early detection. The cancerous tissues and assess the chemotherapy treatment response basis according to adding the information of heat changing with time by the image registration algorithm. The result shows that the proposed image registration algorithm contains certain accuracy. The maximal error is about 1.5 pixels. These suggest the proposed algorithm could prove that the DS-IR system adding time information has potential ability to detect breast cancer or monitor the effect of chemotherapy.

Based on the above descriptions, it is understood that the present invention is indeed an industrially applicable, novel and obvious one with values in industrial development. While the invention has been described in terms of what are presently considered to be the most practical and preferred embodiment, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. An image registration method, comprising steps of:
   obtaining a spectrogram of infrared images;
   detecting a first plurality of feature points on a target image being at least one of a first single image and a first series image of the spectrogram, and a second plurality of feature points on a source image being at least one of a second single image and a second series image of the spectrogram, wherein the first plurality of feature points has a first plurality of cross-points of the vessel middle lines and the second plurality of feature points has a second plurality of cross-points of the vessel middle lines;
   searching a plurality of corresponding point pairs to determine corresponding relationships between the first plurality of feature points on the target image and the second plurality of feature points on the source image, wherein the corresponding point pair includes a pair of feature points; and
   correcting locations of the plurality of corresponding point pairs to obtain a registered source image.

2. The method as claimed in claim 1, wherein the first plurality of feature points further include a first plurality of corner points determined by a Harris corner detector and the second plurality of feature points further include a second plurality of Harris corner points determined by the Harris corner detector.

3. The method as claimed in claim 1 quantifying a longitudinal infrared image.

4. The method as claimed in claim 1, wherein the plurality of cross-points of vessel middle lines are obtained by the following steps:
   (a) analyzing a characteristic value in every pixel of the spectrogram by using a Hessian matrix in order to obtain a general heat pattern based on a variation of an image intensity of the spectrogram along a direction of a characteristic vector; and
   (b) estimating a vessel heat pattern from the general heat pattern to obtain the plurality of cross-points of vessel middle lines.

5. The method as claimed in claim 1, wherein each of the plurality of the cross-points of vessel middle lines is an intersection of at least two vessels on the spectrogram.

6. The method as claimed in claim 1, wherein the corresponding point pair, consisting of a first feature point and a second feature point, is established manually or automatically.

7. The method as claimed in claim 1, wherein the correcting step comprises:
   using the plurality of corresponding pairs as a data set with a plurality of transformed parameters for a Thin-Plate Spline (TPS) transformed model;
   measuring a mutual information (MI) between the target image and the source image;
   applying the MI as a cost function to a Nelder-Mead simplex method;
   modifying the locations of the second plurality of feature points based on results of the Nelder-Mead simplex method; and maximizing the MI through the TPS transformed model within iterations to obtain the registered source image.

8. The method as claimed in claim 7, wherein the MI is measured by a similarity measure based on an Entropy and the MI is used for comparing and measuring quantitatively a difference between the target image and the registered source image.

9. The method as claimed in claim 1, wherein the correcting step is further used for a subpixel registration for the second plurality of feature points.

10. The method as claimed in claim 1, wherein the target image further includes a first long-wave Infra-red (LIR) image and a first middle-wave Infra-red (MIR) image and the source image further includes a second long-wave Infra-red (LIR) image and a second middle-wave Infra-red (MIR) image.

11. The method as claimed in claim 1, wherein the source image is one of a single time image and a time-series image.

* * * * *